United States Patent [19]
Vandenbroek

[11] 3,779,509
[45] Dec. 18, 1973

[54] BALL VALVE

[75] Inventor: Christiaan J. H. Vandenbroek, Ann Arbor, Mich.

[73] Assignee: Thetford Corporation, Ann Arbor, Mich.

[22] Filed: June 1, 1972

[21] Appl. No.: 258,901

[52] U.S. Cl............... 251/148, 251/175, 251/315, 251/317
[51] Int. Cl............................................ F16k 5/02
[58] Field of Search.................. 251/148, 151, 152, 251/175, 315, 316, 317

[56] References Cited
UNITED STATES PATENTS

| | | |
|---|---|---|
| 1,327,984 | 1/1920 | Campbell........................... 251/315 |
| 3,463,451 | 8/1969 | Treadwell.......................... 251/315 |
| 2,809,800 | 10/1957 | Ahl..................................... 251/148 |
| 3,356,334 | 12/1967 | Scaramucci.................... 251/175 X |

FOREIGN PATENTS OR APPLICATIONS

| | | | |
|---|---|---|---|
| 1,194,666 | 6/1970 | Great Britain...................... 251/315 |
| 1,060,206 | 6/1959 | Germany........................... 251/317 |

*Primary Examiner*—Harold W. Weakley
*Attorney*—Olsen & Stephenson

[57] ABSTRACT

A ball valve that is of the floating-ball type wherein the ball is enclosed by a two-piece housing and is actuated by a stem. The stem is keyed to the ball and projects through the housing. The upstream half of the housing defines a rigid seat facing downstream. A single cylindrical flexible seal seals the mating joint of the two-piece housing and provides a flexible seat facing upstream towards the rigid seat. The ball is positioned between the rigid and flexible seats so that the upstream fluid pressure will act on the ball tending to increase the effectiveness of the seal.

9 Claims, 4 Drawing Figures

PATENTED DEC 18 1973                                            3,779,509

3,779,509

BALL VALVE

BACKGROUND OF THE INVENTION

The present invention relates to ball valves and is particularly adapted for use in water supply systems for toilets and the like. When so used, the valve is normally made of the flushing mechanism for the toilet. Under these circumstances, it is particularly desirable that the ball valve member turn easily and that optimum sealing conditions within the ball valve are provided.

There has existed a need for a ball valve that requires a low torque to turn the valve stem while at the same time providing a unit that is characterized by its low cost, durability and effective sealing qualities.

SUMMARY OF THE INVENTION

According to a preferred form of the present invention, a ball valve is provided which has a valve housing with an upstream female portion and a downstream male portion matingly connected together and through which a passageway for flow of fluid extends. The female portion defines a rigid socket in the passageway adjacent to the downstream end thereof which provides an annular rigid seat facing the downstream end. The male portion has an annular extension or reduced diameter as its upstream end. An annular seal having a sleeve portion in a state of compression between the outer surface of the annular extension and the inner surface of the female portion is provided. The annular seal has an annular resilient seat overlapping the end of said extension and facing the annular seat of the female portion. The female portion also has a valve stem opening through its wall between said rigid seat and said flexible seat. A ball is mounted in floating relation between the rigid and resilient seats and has a through passageway with ports at opposite ends. The ball is rotatable between an open position in which its ports are centered on said seats and a closed position which its ports are disposed between said seats. The ball has a keyway in a plane perpendicular to its passageway, and a valve stem is mounted in the valve stem opening and has an end in the shape of a key that is located in the keyway. By virtue of this arrangement the ball can float in the socket and the fluid pressure from the upstream end when the valve is closed will exert pressure on the ball to aid in producing a more effective seal at the flexible seat.

Thus, it is one of the objects of the present invention to provide an improved ball valve that is characterized by its simple construction and effective sealing qualities, and which also can be turned between its open and closed positions with a minimum of torque applied to the valve stem.

Other objects of this invention will appear in the following description and appended claims, reference being had to the accompanying drawings forming a part of this specification wherein like reference characters designate corresponding parts in the several views.

Figure 1:
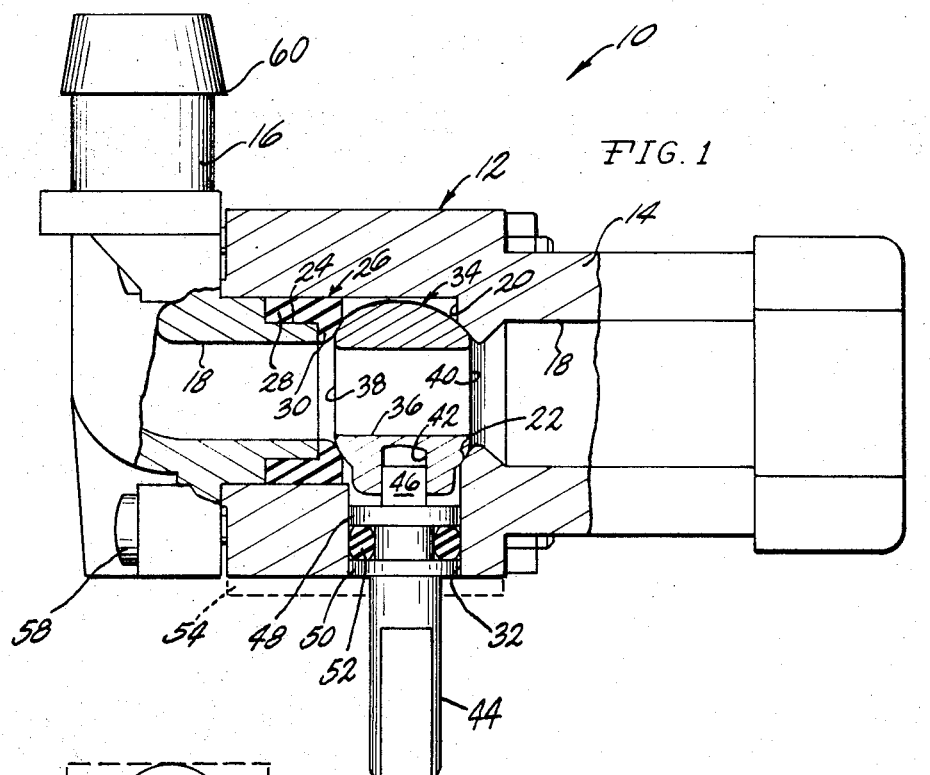
FIG. 1 is a side elevational view, partly in section, of a ball valve embodying the present invention illustrated in its open position.
Figure 3:
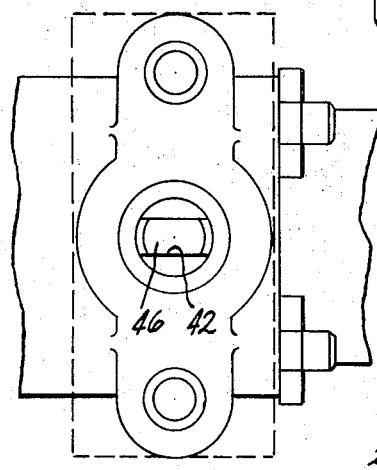
FIG. 3 is a fragmentary bottom plan view of the portion of the ball valve illustrated in FIG. 2.

DESCRIPTION OF THE PREFERRED EMBODIMENT.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

The ball valve assembly 10 comprises a valve housing 12 that has an upstream female portion 14 and a downstream male portion 16 matingly secured together through which a passageway 18 extends for passage of fluid. The female portion defines a rigid socket 20 adjacent to the downstream end which provides an annular rigid seat 22 facing the downstream end. The male portion 16 has an annular extension 24 of reduced diameter at its upstream end. An annular seal 26 is located between the connected ends of the male and female portions 14 and 16 and includes a sleeve portion 28 that is held in a state of compression between the radially outer surface of the annular extension 24 and the inner surface of the female portion 14. Integrally formed with the sleeve portion 28 is an annular resilient seat 30 which overlaps the end of the extension 24 and faces the rigid seat 22 of the female portion 18.

Figure 2:
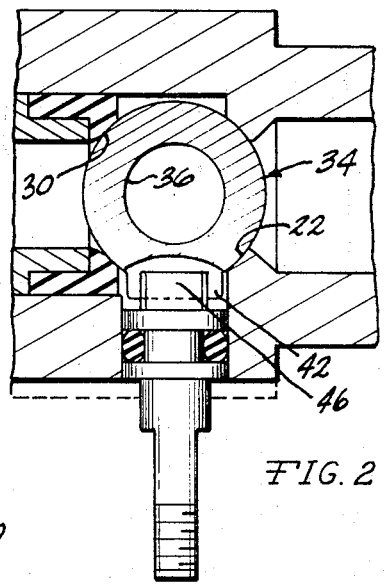
FIG. 2 is a fragmentary view similar to that of FIG. 1 but showing the ball valve in its closed position.
Figure 4:
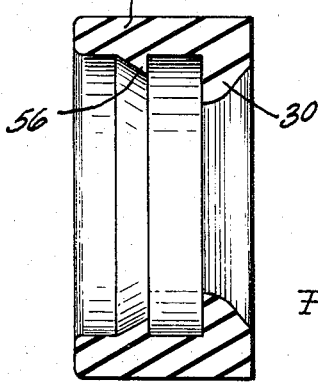
FIG. 4 is an enlarged cross section of the seal that forms the seat for the ball valve.

The female portion 14 has a valve stem opening 32 opening through its wall between the rigid seat 22 and the flexible seat 30. A ball 34 is positioned in floating relation between the rigid and resilient seats 22 and 30. The ball has a through passageway 36 with ports 38 and 40 at opposite ends. The ball 34 is rotatable between an open position such as is shown in FIG. 1 in which the ports 38 and 40 are centered on the seats 30 and 22, and a closed position in which the ports 38 and 40 are disposed between the seats 30 and 22, as shown in FIG. 2. The rigid seat 22 is a relatively thin annular segment of a sphere so that minimum frictional resistance to turning of the ball 34 with respect to the housing occurs.

The ball 34 has a keyway or slot 42 in a plane perpendicular to the through passageway 36, and a valve stem 44 is mounted in the valve stem opening 32 and has an end 46 in the shape of a key that is located in the keyway or slot 42. Thus, when the valve is in the closed position shown in FIG. 2, fluid pressure from the upstream end of the ball valve assembly will exert pressure on the upstream side of the ball urging it against the resilient valve seat 30. Thus, a more effective seal is provided.

The valve stem 44 has two axially spaced annular shoulders 48 and 50, and located between the annular shoulders 48 and 50 is resilient sealing ring 52 for providing a seal in the valve stem opening.

From the above description it will be understood that only two seals are required for the ball valve assembly 10, the single annular seal 26 which performs the dual function of providing an effective seal between the interconnected male and female portions 14 and 16, and also of providing an effective seal around the surface of the ball 34. The second seal is the annular ring 52 which provides the seal around the valve stem 44.

The annular shoulder 50 also performs an additional function in that it is used to assist in holding the valve stem 44 in its normal location against axial displacement. As shown in FIG. 1, a suitable cover plate 54 can be positioned over the end of the housing 12, at the stem opening 32 and secured in place so that the valve stem cannot be axially displaced. Any other suitable closure plate or means can be provided, such as mounting bracket in the toilet structure on which the ball valve assembly 10 is mounted.

One of the features of the present invention is the simple manner in which the valve assembly 10 can be assembled. The male and female portions can be matingly connected together after the ball 34 has been inserted in the socket 20. In carrying out this operation, the seal 26 will initially be pressed onto the upstream end of the male portion 16. It will be noted that the annular seal 26 has an inwardly projecting shoulder 56 which will be fitted over the reduced portion 24 of the male fitting so as to provide a relatively tight seal between the annular seal 26 and the reduced end portion 24. Thereafter, the male portion with the annular seal 26 positioned thereon can be pressed into the female portion 14 and the annular seal 26 will be retained in a state of compression so as to provide a very effective seal between these mating parts. Thereafter, suitable machine screw 58 are used for securing the two portions of the housing 12 together. The valve stem 44 usually will be pressed into position prior to the final assembly of the male and female portions 14 and 16.

In the preferred embodiment illustrated in the drawings, the male portion 16 has at its downstream end a male hose barb 60 and the male portion is L-shaped, but it will be recognized that other suitable shapes and fittings may be used with the present ball valve assembly without departing from the scope of the present invention.

It is claimed:

1. A valve assembly comprising a valve housing having an upstream female portion and a downstream male portion matingly connected together and through which portions a passageway for flow of fluid extends, said female portion defining an integral socket in the passageway adjacent to the downstream end thereof which provides an annular rigid seat relatively thin in width facing said downstream end, an annular seal located between the connected ends of said portions and having an annular resilient seat facing the annular rigid seat of said female upstream portion, a ball mounted between and supported solely on the annular seats of said socket and said annular seal, said ball having a through passageway with ports at opposite ends, the ball being rotatable between an open position in which said ports are centered on said seats and a closed position in which said ports are disposed between said seats, said ball being in a free floating state when in its closed position so that fluid pressure acting on the upstream side of the ball will urge the ball against annular resilient seat.

2. The valve assembly that is defined in claim 1, wherein said male portion has an annular extension of reduced dimension at its upstream end, said annular seal having a sleeve portion that is in a state of compression between the outer surface of said extension and the inner surface of said female portion to provide a seal therebetween, said annular resilient seat being integrally joined to said sleeve portion and overlapping the end of said extension to provide a seal with the seated surface of the ball.

3. The valve assembly that is defined in claim 1, wherein said female portion has a valve stem opening located immediately downstream of said annular seat of the socket, and a valve stem is positioned in said opening for rotating said ball between its open and closed positions.

4. The valve assembly that is defined in claim 3, wherein said ball has a transverse slot in a plane perpendicular to said through passageway, and said valve stem has an end slidable in said slot for rotating the ball while allowing floating action of the ball when in its closed position.

5. The valve assembly that is defined in claim 3, wherein said valve stem includes two axially-spaced annular shoulders providing bearing surfaces in the valve stem opening, and a resilient sealing ring is located between said shoulders.

6. The valve assembly that is defined in claim 5, wherein the axially outer annular shoulder is flush with the exterior surface of said female portion to allow retention of the valve stem in said female portion by a cover plate.

7. A valve assembly comprising a valve housing having an upstream female portion and a downstream male portion matingly connected together and through which portions a passageway for flow of fluid extends, said female portion defining a rigid socket in the passageway adjacent to the downstream end thereof which provides a relatively thin annular rigid seat facing said downstream end, said male portion having an annular extension of reduced diameter at its upstream end, an annular seal having a sleeve portion in a state of compression between the outer surface of said annular extension and the inner surface of said female portion and having a relatively thin annular resilient seat overlapping the end of said extension and facing the annular rigid seat female said femal portion, said female portion having a valve stem opening through its wall between said annular rigid seat and said annular flexible seat, a ball mounted in floating relation between the annular rigid and resilient seats and having a through passageway with ports at opposite ends, the ball being rotatable between an open position in which said ports are centered on said seats and a closed position in which said ports are disposed between said seats, said ball having a keyway in a plane perpendicular to said through passageway, and a valve stem mounted in said valve stem opening and having an end in the shape of a key that is located in said keyway.

8. The valve assembly that is defined in claim 7, wherein said male portion has an L-shaped configuration, the base of the L-shaped configuration including said annular extension.

9. The valve assembly that is defined in claim 8, wherein the upright member of the L-shaped configuration includes a male hose barb at its remote end.

* * * * *

CERTIFICATE OF CORRECTION

Patent No. 3,779,509   Dated December 18, 1973

Inventor(s) Christiaan J. H. Vanden Broek

It is certified that error appears in the above-identified patent and that said Letters Patent are hereby corrected as shown below:

Claim 7, Column 4, line 43, "female said femal" should read - - of said female - - .

Signed and sealed this 9th day of April 1974.

(SEAL)
Attest:

EDWARD M. FLETCHER, JR.
Attesting Officer

C. MARSHALL DANN
Commissioner of Patents